United States Patent
Vudathu et al.

(10) Patent No.: US 11,190,350 B2
(45) Date of Patent: Nov. 30, 2021

(54) SYSTEMS AND METHODS FOR USING AN OAUTH CLIENT SECRET TO ENCRYPT DATA SENT TO BROWSER

(71) Applicant: JPMORGAN CHASE BANK, N.A., New York, NY (US)

(72) Inventors: Raghuram Vudathu, Downingtown, PA (US); Anupam Arora, Middletown, DE (US); Gayathri Sundar, Irving, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 337 days.

(21) Appl. No.: 16/452,032

(22) Filed: Jun. 25, 2019

(65) Prior Publication Data

US 2019/0394032 A1 Dec. 26, 2019

Related U.S. Application Data

(60) Provisional application No. 62/689,451, filed on Jun. 25, 2018.

(51) Int. Cl.
*H04L 29/06* (2006.01)
*H04L 9/08* (2006.01)
(Continued)

(52) U.S. Cl.
CPC ............ *H04L 9/0866* (2013.01); *G06F 9/547* (2013.01); *H04L 9/321* (2013.01); *H04L 9/3239* (2013.01); *H04L 63/0428* (2013.01)

(58) Field of Classification Search
CPC ..... H04L 9/0866; H04L 9/321; H04L 9/0643; H04L 9/3213; H04L 9/3239;
(Continued)

(56) References Cited

U.S. PATENT DOCUMENTS 10,084,780 B2 * 9/2018 Bao ...................... H04L 63/0435
10,887,301 B1 * 1/2021 Vera .................... G06F 16/1824
(Continued)

OTHER PUBLICATIONS

D. Hardt, Ed., "The OAuth 2.0 Authorization Framework", IETF RFC 6749, Published Oct. 2012 (Year: 2012).*
(Continued)

*Primary Examiner* — Chau Le
(74) *Attorney, Agent, or Firm* — Greenberg Traurig LLP

(57) ABSTRACT

Systems and methods for using an OAUTH client-secret to encrypt data sent to browser are disclosed. In one embodiment, in an issuer authorization services processing apparatus comprising at least one computer processor, a method for using an OAUTH client-secret to encrypt data may include: (1) receiving, from a client, a registration request; (2) returning, to the client, a client identifier, a client secret, and a nonce; (3) generating an extended client secret using a combination of the client identifier, the client secret, and the nonce; (4) storing the extended client secret; (5) receiving, from the client, encrypted plaintext data; (6) decrypting the encrypted plaintext data using the extended client secret; and (7) providing an encrypted response to the plaintext data, the encrypted response encrypted using the extended client secret.

19 Claims, 3 Drawing Sheets

(51) Int. Cl.
*H04L 9/32* (2006.01)
*G06F 9/54* (2006.01)

(58) Field of Classification Search
CPC ............ H04L 63/0428; H04L 63/0807; H04L 63/083; G06F 9/54; G06F 9/547
See application file for complete search history.

(56) References Cited

U.S. PATENT DOCUMENTS

| | | |
|---|---|---|
| 2012/0136936 A1 | 5/2012 | Quintuna |
| 2013/0191884 A1* | 7/2013 | Leicher ................... H04L 63/08 726/4 |
| 2013/0268755 A1* | 10/2013 | Simmons ............ H04L 63/0823 713/156 |
| 2014/0281487 A1* | 9/2014 | Klausen .................. H04L 63/06 713/153 |
| 2016/0241403 A1 | 8/2016 | Lindermann |
| 2017/0171200 A1* | 6/2017 | Bao ..................... H04L 63/0876 |
| 2018/0152440 A1 | 5/2018 | Hande et al. |

OTHER PUBLICATIONS

International Search Report, dated Sep. 20, 2019, from corresponding International Application No. PCT/US2019/038996.
Written Opinion of the International Searching Authority, dated Sep. 20, 2019, from corresponding International Application No. PCT/US2019/038996.

* cited by examiner

SYSTEMS AND METHODS FOR USING AN OAUTH CLIENT SECRET TO ENCRYPT DATA SENT TO BROWSER

RELATED APPLICATIONS

This application claims priority to and the benefit of U.S. Provisional Patent Application Ser. No. 62/689,451, filed Jun. 25, 2018, the disclosure of which is hereby incorporated, by reference, in its entirety.

BACKGROUND OF THE INVENTION

1. Field of the Invention

The present disclosure generally relates to systems and methods for using an OAUTH client-secret to encrypt data sent to browser.

2. Description of the Related Art

When a Client registers for Services protected by OAUTH2.0, the client is given a Client-ID and a Client-Secret, which is equivalent to a username/password as far as that client is concerned. Every time an access token is requested, as part of HTTP Basic authentication header, the client presents the base64 encoded Client-ID and Client-Secret for the OAUTH service provider to validate. For a confidential client, this parameter is persisted securely in the backend, and should not be shared with a mobile application/browser client which would be requesting on behalf of an actual user.

Often, it is desired to redirect the client from browser/native mobile application context to another session belonging to a different domain/or different browser instance. To do this, the information may be secured, for example, using Security Assertion Markup Language (SAML) or JSON Web Tokens (JWT). Both these approaches are convoluted and involves its own security derivatives for data repudiation and encryption. Moreover, SAML does not scale well within a mobile native application, as it is desired for a web browser client.

SUMMARY OF THE INVENTION

Systems and methods for using an OAUTH client-secret to encrypt data sent to browser are disclosed. In one embodiment, in an information processing apparatus comprising at least one computer processor, a method for using an OAUTH client-secret to encrypt data may include: (1) registering with a service provider for at least one service; (2) receiving, from the service provider, a client identifier, a client secret, and a nonce; (3) generating an extended client secret using a combination of the client identifier, the client secret, and the nonce; and (4) encrypting a plaintext communication to the service provider using the extended client secret.

In one embodiment, the registration with the service provider may include a redirect URL, an application name, and a client name.

In one embodiment, the service provider may generate the client identifier and the client secret.

In one embodiment, the client identifier may be an OAUTH client identifier, and the client secret may be an OAUTH client secret.

In one embodiment, the method may further include receiving an encrypted response to the plaintext communication from the service provider; and decrypting the encrypted response with the extended client secret.

In one embodiment, the method may further include expiring the extended client secret.

In one embodiment, the extended client secret may be generated using the following algorithm: SHA256Hash(Client-ID) XOR SHA256Hash(Client-Secret) XOR nonce.

According to another embodiment, in an issuer authorization services processing apparatus comprising at least one computer processor, a method for using an OAUTH client-secret to encrypt data may include: (1) receiving, from a client, a registration request; (2) returning, to the client, a client identifier, a client secret, and a nonce; (3) generating an extended client secret using a combination of the client identifier, the client secret, and the nonce; (4) storing the extended client secret; (5) receiving, from the client, encrypted plaintext data; (6) decrypting the encrypted plaintext data using the extended client secret; and (7) providing an encrypted response to the plaintext data, the encrypted response encrypted using the extended client secret.

In one embodiment, the registration request may include a redirect URL, an application name, and a client name.

In one embodiment, the client identifier may be an OAUTH client identifier, and the client secret may be an OAUTH client secret.

In one embodiment, the method may further include expiring the extended client secret.

In one embodiment, the extended client secret may be generated using the following algorithm: SHA256Hash(Client-ID) XOR SHA256Hash(Client-Secret) XOR nonce.

In one embodiment, the method may further include refreshing the nonce.

According to another embodiment, a system for using an OAUTH client-secret to encrypt data may include an issuer authorization services processing apparatus comprising at least one computer processor, an API gateway, and an API middleware system. The API gateway may receive, from a client a registration request and may return to the client, a client identifier, a client secret, and a nonce. The API gateway may then generate an extended client secret using a combination of the client identifier, the client secret, and the nonce. The API gateway may provide the extended client secret to an API middleware system, and the API middleware system may store the extended client secret. The API gateway may receive from the client, encrypted plaintext data, and may provide the encrypted plaintext data to the API middleware system. The API middleware system may decrypt the encrypted plaintext data using the extended client secret, and may provide the API gateway with an encrypted response to the plaintext data, the encrypted response encrypted using the extended client secret. The API gateway may then provide the encrypted response to the client.

In one embodiment, the registration request may include a redirect URL, an application name, and a client name.

In one embodiment, the client identifier may be an OAUTH client identifier, and the client secret may be an OAUTH client secret.

In one embodiment, the API gateway may expire the extended client secret.

In one embodiment, the extended client secret may be generated using the following algorithm: SHA256Hash(Client-ID) XOR SHA256Hash(Client-Secret) XOR nonce.

In one embodiment, the API gateway may refresh the nonce.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

The present disclosure generally relates to systems and methods for using OAUTH Client-secret to encrypt data sent to browser.

Embodiments are directed to a system and method that extends the Client-ID/Client-Secret that was given to an OAUTH client to derive an AES Key (e.g., an "Extended Client-Secret") that may be used to encrypt data that is transferred across browser sessions/redirects. For example, a one-time per OAUTH session key may be derived that may be tied to, or associated with, the lifetime of, for example, the access token, to encrypt data that can be either part of query parameters that are passed during the redirect, or any data that may be posted as part of the 302 redirect.

The authorization code that is sent as part of the GET/ Authorize response may also be encrypted using this Extended Client-Secret, thereby reducing the risk as accepted by OAUTH2.0.

The Extended Client-secret may be derived each time the Client's HOST makes a call to get the AccessToken to get a valid Access Token.

Embodiments may ensure that no user specific data is in the clear on in the browser context. This could be passed via query parameters or via HTTP POST. Thus, user information from a previous user session cannot be extracted.

Embodiments may provide some or all of the following advantages: embodiments may not rely on new pre-shared secrets to be exchanged by both parties trying to secure data passed as query parameters/or part of HTTP POST; both parties may derive the same encryption key without actual transmission of the key over the air, out-of-band communication, etc.; security of the key may not depend on keeping the formula secret as a nonce may be fed to increase randomness (and the client ID and client-secret are secured); there is no known attack against AES that can derive the key with either of known cipher-text or a known plaintext attack, etc.

Figure 1:
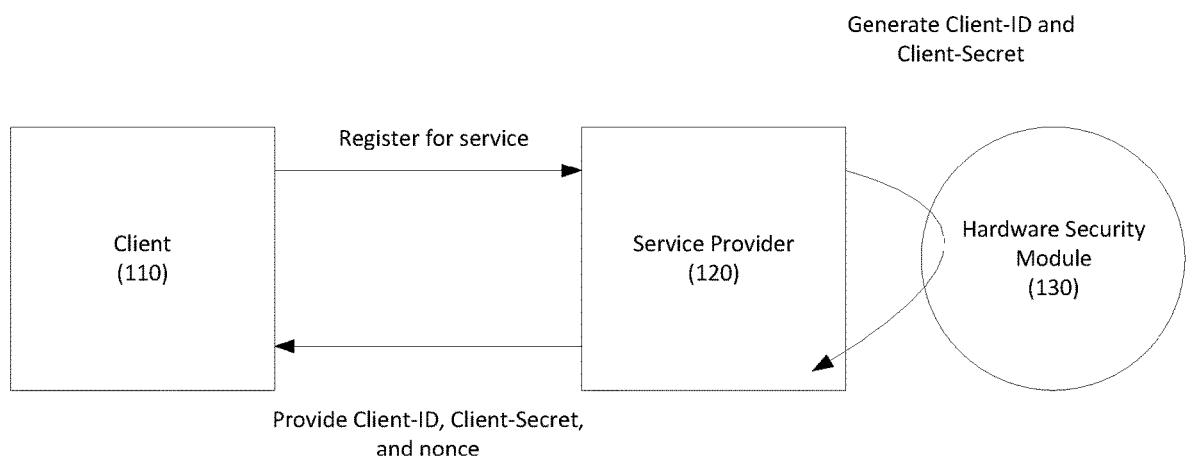
FIG. 1 depicts a system and method for using an OAUTH client-secret to encrypt data sent to browser according to one embodiment.

Referring to FIG. 1, an exemplary process of nonce exchange during registration is provided according to one embodiment. When client 110 registers for a service, it exchanges information, such as redirect-URL, application name, and client information, etc. with service provider 120 (e.g., issuer authorization services). On successful registration, service provider 120 may create a Client-ID and a Client-Secret, and may provide the Client-ID and Client-Secret to client 110. Next, along with Client-Secret, a new nonce (e.g., 16 bytes) may be generated and provided to client 110.

In one embodiment, client 110 may be an internal or external entity. Client 110 may be a merchant, an application, a person, etc.

In one embodiment, the Client-ID, Client-Secret, and new nonce may be generated by hardware security module 130.

The nonce may be added as a source for key rotation. A new nonce may be exchanged as part of the subsequent POST/Token calls for 2-legged OAUTH.

At any given point in time, only one nonce may be valid on both client 110 and service provider 120 for a given access token. In one embodiment, an access token may be an OAUTH-based token that may represent the customer on the client side. It may have a one-to-one mapping; thus, one customer will have one access token.

In embodiments, the Extended Client-Secret key may be generated and may be limited to the time of the access token.

In one embodiment, the nonce may be refreshed during the POST/Token call. For example, the nonce may be used to encrypt data that either (1) originated at client 110 and needs to be decrypted by service provider 120 or (2) originated at service provider 120 and needs to be decrypted by client 110. In either case, the originating party (the side that performs the encryption) may mark the nonce as used and continue to be valid for the lifetime of the current Access Token.

For example, for 2-legged OAUTH, the access token does not expire, and has a lifetime of configurable days of inactivity. Thus, client 110 and service provider 120 may maintain a threshold for nonce expiration, which may be a combination of nonce_expiration_time and nonce_encrypted_buffer. Upon reaching either threshold, client 110 may initiate a new POST/Token call to get the new nonce.

For 3-legged OAUTH, the nonce may be valid for a set duration (e.g., a short duration), and the nonce validity may be tied to the access token. Both client 110 and service provider 120 may save the nonce against the access token to use the correct nonce during encryption and decryption so that it does not conflict in a distributed computing environment.

In one embodiment, the Extended Client-Secret may be derived as follows. First, a first host and a second authorization host may have the copy of the client-secret persisted in respective databases in a hashed form. Both parties may derive an AES key by, for example the following:

SHA256Hash(Client-ID) XOR SHA256Hash(Client-Secret) XOR nonce

Next, both parties may discard the Extended Client-Secret when the access token expires.

In embodiments, a modified POST/Token Call to get a new nonce may be as follows:

POST /token HTTP/1.1
Host: server.example.com Authorization:
Basic czZCaGRSSa3F0MzpnWDFmQmF0M2JW
Content-Type: application/x-www-form-urlencoded

```
    grant_type=authorization_code&code=SplxlOBeZQQYbYS6WxSbIA
&redirect_uri=https%3A%2F%2Fclient%2Eexample%2Ecom%2Fcb
    Response
    HTTP/1.1 200 OK
    Content-Type: application/json;charset=UTF-8
    Cache-Control: no-store Pragma: no-cache
{
    access_token":"2YotnFZFEjr1zCsicMWpAA",
    "nonce" : "9c64de6781c1f5f3170d90c8f97a4246
    "token_type":"example", "
    expires_in":3600,
    "refresh_token":"tGzv3JOkF0XG5Qx2TlKWIA",
    "example_parameter":"example_value"
}
```

Figure 2:
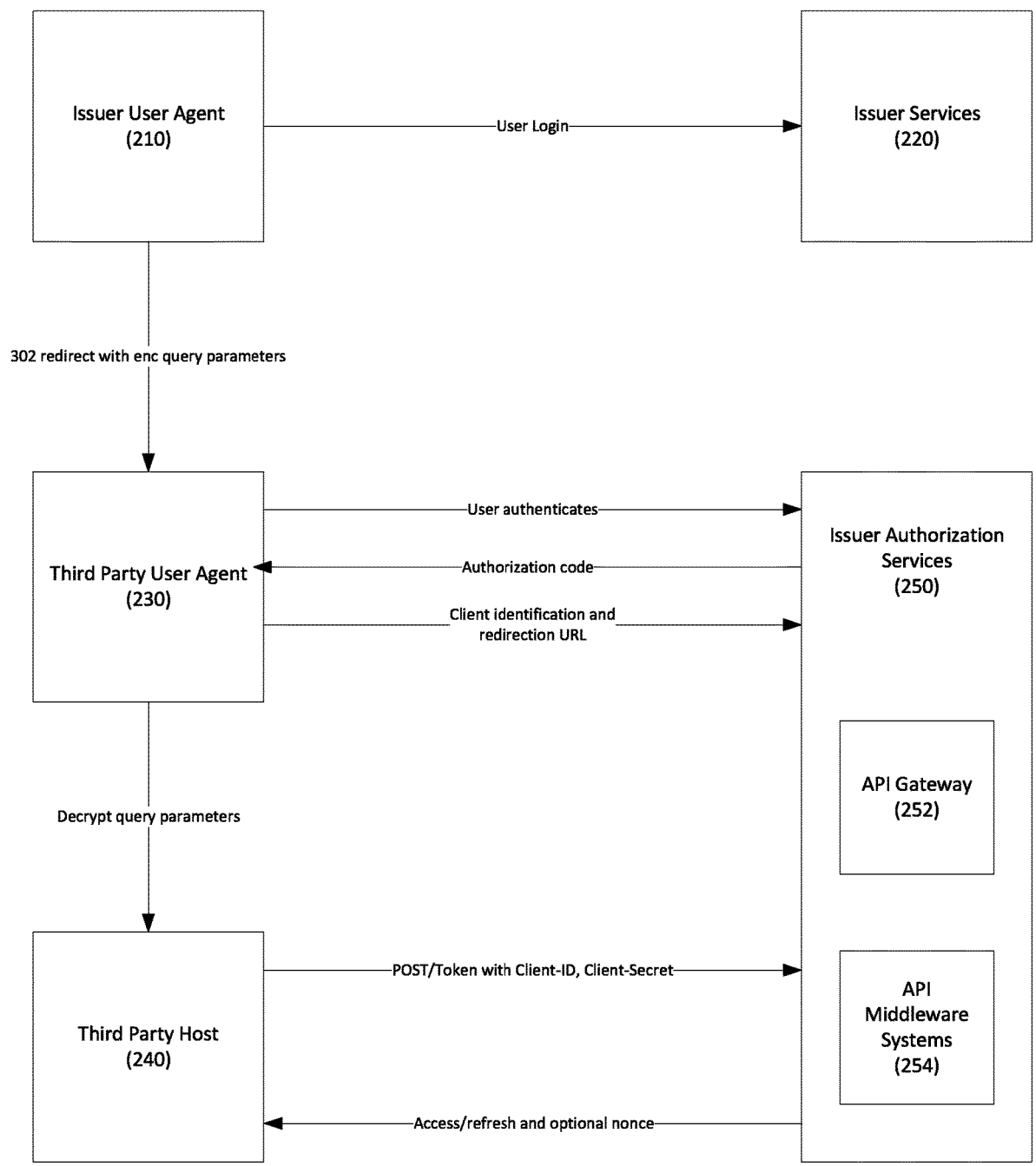
FIG. 2 depicts a system and method for using an OAUTH client-secret to encrypt data sent to browser according to another embodiment.

Referring to FIG. 2, a system and method for using an OAUTH client-secret to encrypt data sent to browser are illustrated according to another embodiment.

First, issuer user agent 210 may log in to issuer services 220 for an issuer of a financial instrument. Issuer user agent may be returned a 302 redirect with encrypted query parameters, and may provide that to third party user agent 230. Examples of user agent 230 is an application or program where the customer can log in.

As an illustrative example, the query parameters may be name-value pairs. In the URL http://www.example.com:80/products/search?firstName=John&socialsecurity=1234567890, the query parameters are anything after the "?" that are separated by the "&" (e.g., firstName=John &socialSecurity=1234567890.

Because it is not good practice to send data, such as a social security number, the data may be encrypted using the Extended Client-Secret before it is sent.

Thus, encrypting 1234567890 with the Extended Client-Secret may result in something like njBiqD6wVAuwxzsNEMHYsA. Thus, the URL will now look like http://www.example.com:80/products/search?firstName=John&social security=niBiqD6wVAuwxzsNEMHYsA.

Third party user agent 230 may authenticate the user to issuer authorization services 250, which may return an authorization code to third party user agent 230. Third party user agent 230 may then return a client identification and the redirection URL to issuer authorization services 250.

Third party user agent 230 may also decrypt the query parameter using the Extended Client-Secret and may make a POST/token call with the Client-ID and Client-Secret to issuer authorization services 250 using, for example, API gateway 252.

Continuing with the illustrative example, above, decrypting njBiqD6wVAuwxzsNEMHYsA with the Extended Client-Secret will result in the actual social security number 1234567890.

API middleware systems 254 may provide access and may return a nonce to third party host 240.

Figure 3:
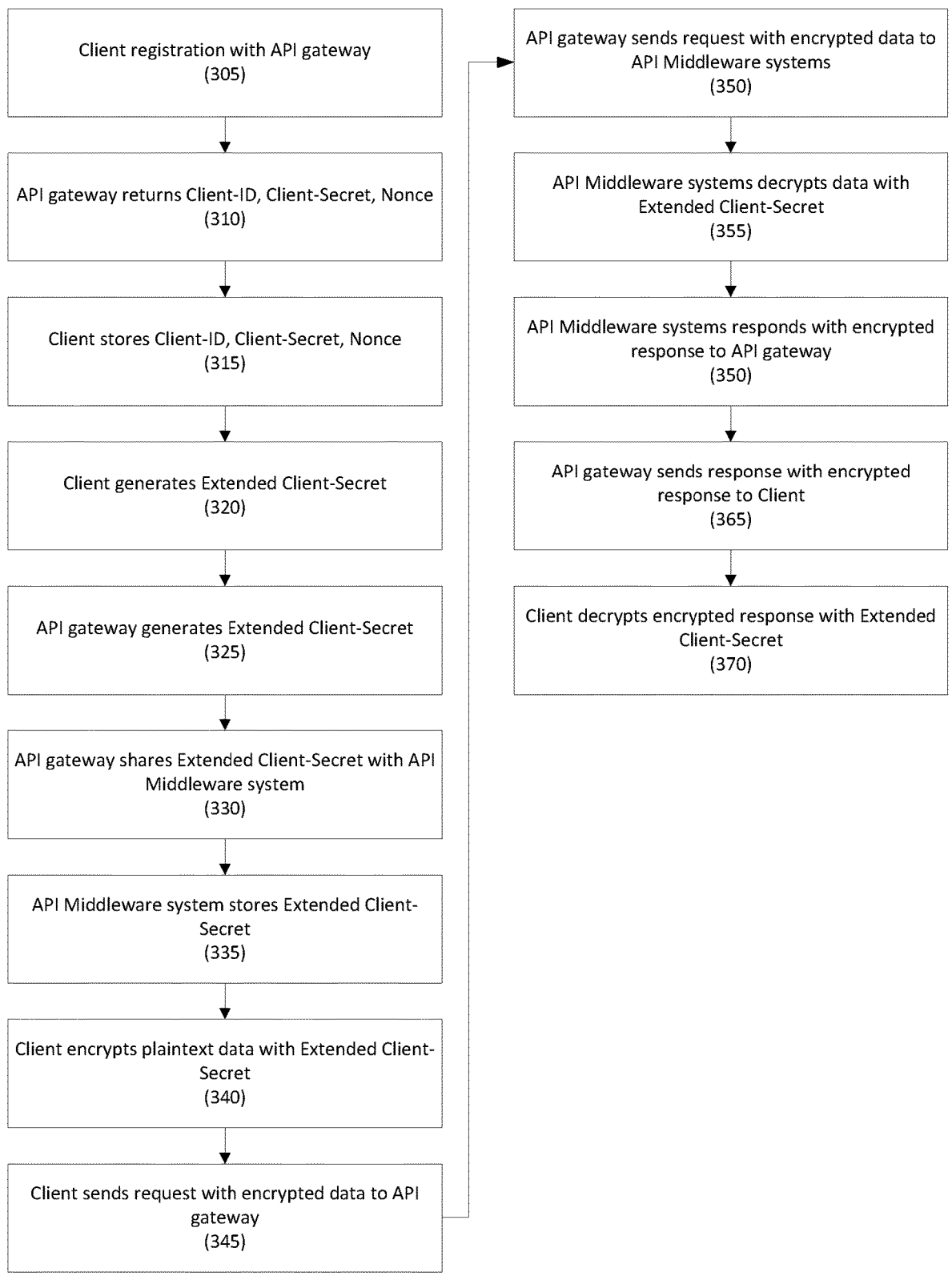
FIG. 3 depicts a method for using an OAUTH client-secret to encrypt data via an API gateway is illustrated according to one embodiment.

Referring to FIG. 3, a method for using an OAUTH client-secret to encrypt data via an API gateway is illustrated according to one embodiment.

In step 305, a client may register with an API gateway that may be part of issuer authorization services for an issuer of a financial instrument. In one embodiment, the client may be an internal or external entity, and may be a merchant, an application, a person, etc.

In step 310, the API gateway may return a client ID (e.g., Client-ID), a Client Secret (e.g., Client-Secret), and a nonce.

In step 315, the client may store the Client-ID, Client-Secret, and nonce.

In step 320, the client may generate an Extended Client-Secret. In one embodiment, the Extended Client-Secret may be generated using any combination of the Client-ID, Client-Secret, and the nonce.

In step 325, the API gateway may generate an Extended Client-Secret. In one embodiment, the API gateway and the client use the same algorithm to generate their respective Extended Client-Secrets.

In step 330, the API gateway may share the Extended Client-Secret with API Middleware systems for the issuer authorization services.

In step 335, the API Middleware systems may store the Extended Client-Secret.

In step 340, the client may encrypt plaintext data with the Extended Client-Secret.

In step 345, the client may send a request with encrypted data to the API gateway.

In step 350, the API gateway may send the request with the encrypted data to API Middleware system.

In step 355, the API Middleware systems may decrypt data with the Extended Client-Secret.

In step 360, the API Middleware systems may respond with encrypted response to the API gateway.

In step 365, the API gateway may send the response with encrypted response to the client.

In step 370, the client may decrypt the encrypted response with the Extended Client-Secret.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for using an OAUTH client-secret to encrypt data comprising:
   in an information processing apparatus comprising at least one computer processor:
   registering with a service provider for at least one service;
   receiving, from the service provider, a client identifier, a client secret, and a nonce;
   generating an extended client secret using a combination of the client identifier, the client secret, and the nonce; and
   encrypting a plaintext communication to the service provider using the extended client secret.

2. The method of claim 1, wherein the registration with the service provider comprises a redirect URL, an application name, and a client name.

3. The method of claim 1, wherein the service provider generates the client identifier and the client secret.

4. The method of claim 1, wherein the client identifier is an OAUTH client identifier, and the client secret is an OAUTH client secret.

5. The method of claim 1, further comprising:
   receiving an encrypted response to the plaintext communication from the service provider; and
   decrypting the encrypted response with the extended client secret.

6. The method of claim 1, further comprising:
   expiring the extended client secret.

7. The method of claim 1, wherein the extended client secret is generated using the following algorithm:
   SHA256Hash(Client-ID) XOR SHA256Hash(Client-Secret) XOR nonce.

8. A method for using an OAUTH client-secret to encrypt data comprising:
   in an issuer authorization services processing apparatus comprising at least one computer processor:
   receiving, from a client, a registration request;
   returning, to the client, a client identifier, a client secret, and a nonce;
   generating an extended client secret using a combination of the client identifier, the client secret, and the nonce;
   storing the extended client secret;
   receiving, from the client, encrypted plaintext data;
   decrypting the encrypted plaintext data using the extended client secret; and
   providing an encrypted response to the plaintext data, the encrypted response encrypted using the extended client secret.

9. The method of claim 8, wherein the registration request comprises a redirect URL, an application name, and a client name.

10. The method of claim 8, wherein the client identifier is an OAUTH client identifier, and the client secret is an OAUTH client secret.

11. The method of claim 8, further comprising:
    expiring the extended client secret.

12. The method of claim 8, wherein the extended client secret is generated using the following algorithm:
    SHA256Hash(Client-ID) XOR SHA256Hash(Client-Secret) XOR nonce.

13. The method of claim 8, further comprising refreshing the nonce.

14. A system for using an OAUTH client-secret to encrypt data comprising:
an issuer authorization services processing apparatus comprising at least one computer processor;
an API gateway; and
an API middleware system;
wherein:
the API gateway receives, from a client a registration request;
the API gateway returns, to the client, a client identifier, a client secret, and a nonce;
the API gateway generates an extended client secret using a combination of the client identifier, the client secret, and the nonce;
the API gateway provides the extended client secret to an API middleware system;
the API middleware system stores the extended client secret;
the API gateway receives from the client, encrypted plaintext data;
the API gateway provides the encrypted plaintext data to the API middleware system;
the API middleware system decrypts the encrypted plaintext data using the extended client secret;
the API middleware system provides the API gateway with an encrypted response to the plaintext data, the encrypted response encrypted using the extended client secret; and
the API gateway provides the encrypted response to the client.

15. The system of claim 14, wherein the registration request comprises a redirect URL, an application name, and a client name.

16. The system of claim 14, wherein the client identifier is an OAUTH client identifier, and the client secret is an OAUTH client secret.

17. The system of claim 14, wherein the API gateway expires the extended client secret.

18. The system of claim 14, wherein the extended client secret is generated using the following algorithm:
SHA256Hash(Client-ID) XOR SHA256Hash(Client-Secret) XOR nonce.

19. The system of claim 14, wherein the API gateway refreshes the nonce.

* * * * *